(12) United States Patent
Landreville et al.

(10) Patent No.: US 6,957,794 B2
(45) Date of Patent: Oct. 25, 2005

(54) ANTI-VIBRATION AND ANTI-TILT STRUCTURE

(75) Inventors: Jean-Luc Landreville, Granby (CA); Roger R. M. Bertrand, Granby (CA); Robert Blouin, Roxton Pond (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/190,948

(22) Filed: Jul. 8, 2002

(65) Prior Publication Data

US 2003/0010877 A1   Jan. 16, 2003

(30) Foreign Application Priority Data

Jul. 12, 2001 (CA) .................................. 2353024

(51) Int. Cl.[7] .............................................. A47F 5/00
(52) U.S. Cl. .............................. 248/124.2; 248/123.2; 248/364; 248/910
(58) Field of Search .................. 248/176.3, 287.1, 248/298.1, 910, 124.1, 122.1, 124.2, 123.11, 248/123.2, 364; 403/387; 396/419, 422, 396/428; 362/11, 12, 16

(56) References Cited

U.S. PATENT DOCUMENTS

| | | | | |
|---|---|---|---|---|
| 183,297 A | * | 10/1876 | Hancock | 126/333 |
| 406,299 A | * | 7/1889 | Overpeck | 362/12 |
| 573,703 A | * | 12/1896 | Robbins | 108/28 |
| 1,307,945 A | * | 6/1919 | Welch | 248/447 |
| 2,107,074 A | * | 2/1938 | Vander Cook | 355/64 |
| 2,124,006 A | * | 7/1938 | Parker | 248/124.2 |
| 2,324,842 A | * | 7/1943 | Huebner | 355/60 |
| 2,520,414 A | * | 8/1950 | Kurtz | 211/171 |
| 2,560,884 A | * | 7/1951 | Nagourney | 248/124.1 |
| 2,872,736 A | * | 2/1959 | Abbott | 33/637 |
| 2,919,091 A | * | 12/1959 | Hineline | 248/124.2 |
| 3,501,840 A | * | 3/1970 | Schiler | 33/556 |
| 3,586,278 A | * | 6/1971 | Simons | 248/165 |
| 3,952,982 A | * | 4/1976 | Lewis | 248/124.2 |
| 4,033,539 A | * | 7/1977 | Bardocz | 248/228.6 |
| 4,168,881 A | | 9/1979 | Rosenberger | |
| 4,236,795 A | * | 12/1980 | Kephart | 396/5 |
| 4,742,825 A | * | 5/1988 | Freund et al. | 606/158 |
| 4,742,947 A | | 5/1988 | Coffman et al. | |
| 4,913,388 A | * | 4/1990 | McCant | 248/123.11 |
| 5,023,755 A | * | 6/1991 | Rosenberg | 362/12 |
| 5,127,614 A | | 7/1992 | Etzold et al. | |
| 5,520,292 A | * | 5/1996 | Lombardi | 211/85.6 |
| 5,615,854 A | * | 4/1997 | Nomura et al. | 248/287.1 |
| 5,732,912 A | * | 3/1998 | Nomura et al. | 248/187.1 |
| 6,000,663 A | * | 12/1999 | Plasse et al. | 248/27.8 |
| 6,119,317 A | * | 9/2000 | Pfister | 24/514 |
| 6,302,280 B1 | * | 10/2001 | Bermes | 211/70.6 |
| 6,390,424 B1 | * | 5/2002 | Kidushim et al. | 248/122.1 |
| 6,554,235 B1 | * | 4/2003 | Fortier | 248/122.1 |

FOREIGN PATENT DOCUMENTS

| | | | | |
|---|---|---|---|---|
| JP | 09243927 A2 | 9/1997 | | G02B 21/24 |
| JP | 2000250128 A2 | 9/2000 | | G03B 17/56 |

*Primary Examiner*—Korie Chan
(74) *Attorney, Agent, or Firm*—Arthur J. Samodovitz

(57) ABSTRACT

An improved structure (stand) for providing flexibility for holding and mounting components, such as microscopes and cameras, in order to eliminate disruptions from undesirable vibrations and tilting of the mounted component. The stand uses a vertical stand member, and a horizontal arm member movably positioned in both vertical and horizontal orientations relative to the stand member. Adjustable brackets and associated clamps are utilized.

9 Claims, 1 Drawing Sheet

ANTI-VIBRATION AND ANTI-TILT STRUCTURE

FIELD OF THE INVENTION

This invention relates to multipurpose stands for holding and mounting a device such as a microscope or camera. More particularly, the invention relates to improved stands for holding such devices so as to minimize vibrations and tilting thereof.

BACKGROUND OF THE INVENTION

As a result of economic and packaging objectives and other needs and requirements for more compact, electrical and electronic components and their interconnections and accompanying greater miniaturization thereof, manufacturers are required to deliver products that have more efficient and effective use of the space and real estate on the surfaces of circuit cards, substrates, circuit boards and the like. The various elements and components making up the circuit product are required to be positioned in greater density and with minimal spacing therebetween. Proper aligning of leads and connections among the components and to terminals on substrates, for example, is becoming more difficult and increasingly critical. These products, components, and their interconnections must be visually inspected before final packaging, encapsulation and incorporating into finished products with the objective of eliminating expensive and inefficient product defects and resultant recalls. Thus, routine visual inspections are performed at various stages in the manufacture of a product by making use of examination by tools such as microscopes. As the degree of miniaturization increases, more powerful microscopes are required in order to effectively carry out these visual inspections. As microscopes of greater power and magnification are required, these microscopes are becoming necessarily larger and heavier in design. As a result, problems caused by vibration of the microscope and its mounting stand and the proper orientation of the microscope become significant in order to provide correct and accurate inspection of these manufactured products. A more sturdy and robust stand than is presently available is needed.

Undesirable vibrations arise from a variety of sources which affect the use of devices mounted on stands, including vibrations resulting from normal manual adjustments, the movement resulting from the shutter of a camera, from the dynamics of microscope accessories, or simply from an operator touching the microscope superstructure. Many previous attempts to deal with vibration problems in microscopes have centered around the isolation of the microscope from its environment by the use of shock mountings. External mechanical vibrations obviously have disturbing effects on the quality of the image resulting from use of a microscope or camera.

Previous efforts have been made in attempts to design stands for the effective mounting of microscopes. While existing stand designs may have certain advantages, these prior designs have not been found to be adequate for present purposes and particularly for those purposes in situations as described above.

One such design is described in U.S. Pat. No. 4,168,881, entitled "Anti-Vibration Microscope Stand", which issued Sep. 25, 1979 to Rosenberger. The description provided in this patent assumes that the most critical relationship in a microscope as inherent vibrations are concerned is the relative positioning of the object lens and the specimen plane. The eye piece and the object lens are separately mounted. The object lens is mounted in a cantilever manner which is rigidly attached to a support pillar. The eye piece is also cantilevered from the support pillar and is free of contact with the object lens except from the remote contact with the pillar. The design is such that vibrations emanating from the eye piece area are absorbed and the eye piece support is isolated from the specimen plane and the object lens mounting member.

Another example is described in U.S. Pat. No. 5,127,614, entitled, "Microscope Stand", which issued Jul. 7, 1997 to Etzold et al. This patent describes a microscope stand consisting of a base, a column, a tubular holder and feet in which a greater level of insensitivity to vibration may be achieved.

Another example of a stand is provided in U.S. Pat. No. 4,742,947, entitled "Optical System For Use As Stand Alone Unit Or With A Device For Attaching Modular Electronic Components To Or Removing Them From A Substrate", which issued May 10, 1988 to Coffman et al. A microscope stand is described which permits a microscope to be horizontally rotated from +90° to −90° and vertically rotated through 90° so as to provide complete viewing of an object.

OBJECTS AND SUMMARY OF THE INVENTION

It is an object of the present invention to provide an improved universal stand for the mounting of devices such as a microscope or camera or the like in order to minimize the adverse affects resulting from vibration and tilting of the device on the stand.

It is a further object of the present invention to provide a stand for mounting and holding a microscope or camera or the like of a large and heavy design so as to eliminate vibration and tilting of the attached microscope.

According to one aspect of the invention, there is provided a stand for mounting a component so as to reduce tilting and vibration of the mounted component. The stand comprises a stand member and an arm member, the stand member adapted for being attached to a work surface in a vertical orientation, adjustable mounting structure attaching the arm member to the stand member for moving the arm member horizontally and vertically with respect to the stand member, the arm member having a projecting end extending in a direction perpendicular to the stand member and spaced from the stand member, and a holder for attaching the component to the projecting end of the arm member.

BEST MODE FOR CARRYING OUT THE INVENTION

Figure 1:
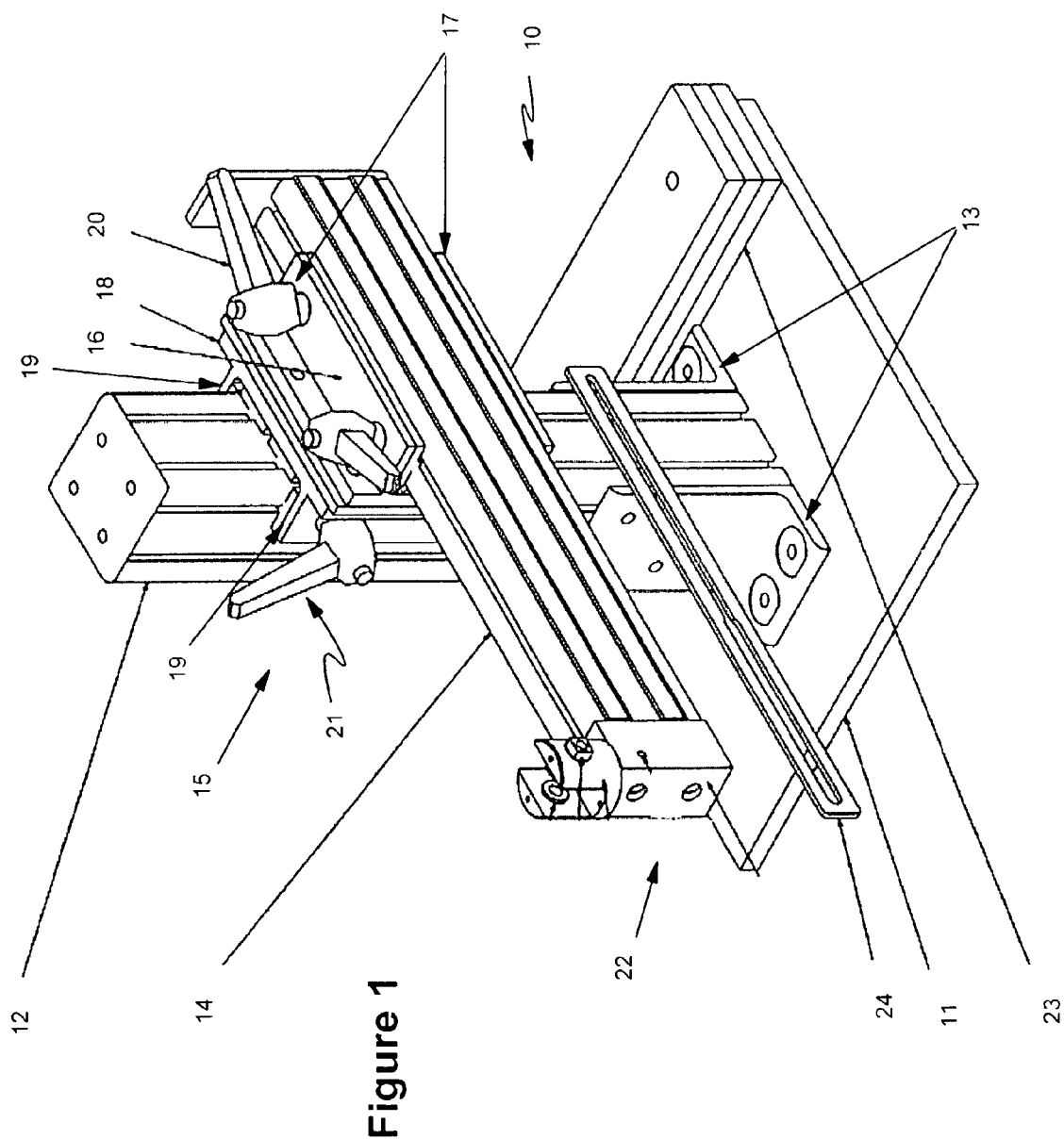
FIG. 1 is an isometric view of an anti-vibration and anti-tilting stand according to one embodiment of the invention.

For a better understanding of the present invention, together with other and further objects, advantages and capabilities thereof, reference is made to the following disclosure and appended claims in connection with the above-described drawings. It is understood that like numerals may be used to indicate like elements from FIG. To FIG.

The need resulting in the present invention, as shown in the embodiment of FIG. 1, arose because of difficulties in working with microscopes providing up to 50×magnification and being over 22 lbs. in weight. Microscopes are becoming even bigger, heavier and more powerful. The need has thus evolved for a universal and multipurpose stand for mounting devices, including microscopes of the aforementioned nature, which would minimize and preferably eliminate unwanted movement of the microscope resulting from vibrations and also to prevent tilting of the mounted microscope. The universal and multipurpose stand, as illustrated in FIG. 1, can be used to mount substantially any such microscope. Some minor accommodation, e.g., a separate adapter or the like, may be needed for different brands, models, etc. of same.

Referring now to FIG. 1, an anti-vibration and anti-tilt stand 10 is shown. In this embodiment of the invention, stand 10 is mounted on base member 11. Base member 11 can be made of any appropriate material but cold rolled steel plated with dull, hard chrome to make it compatible with traditional chemical cleaners, has been found preferable.

Stand member 12 is firmly attached to base member 11 in any appropriate manner, for Stand member 12 is firmly attached to base member 11 in any appropriate manner, for example by brackets 13 as shown. Brackets 13 can be appropriately affixed, such as by being screwed or bolted to base member 11 and stand member 12 to maintain stand member 12 in a vertical orientation relative to member 11.

Arm member 14 is adjustably attached to stand member 12 as will be subsequently described in more detail. Stand member 12 and arm member 14 can be manufactured from appropriate material but it has been found preferable to have them made of anti-vibration heavy weight extruded aluminum, having appropriate channels, slots and grooves as shown, the purpose of which will be further described. Stand member 12 and arm member 14 need not have the same or even similar configurations but it has been found that T-slotted extrusions (shown) supplied by the company 80/20 Inc. of Columbia City, Ind., are preferred. That is, each of the slots shown in members 12 and 14 (i.e., 2 each on the two facing surfaces of member 12) are of a T-shaped internal configuration with the exposed slot shown being the leg of the T and the wider slotted portion (top of the T) located within the member 12 and 14 bodies. The T-slotted extrusions have a 2° decline on the T-slot flange that acts as a lock washer. A clamp, to be subsequently described, is positioned on the outside of the T-slot flange and a bolt connected to the clamp carries a nut located within the groove of the extrusion below the clamp. When the clamp and nut are tightened on the bolt, the flange, as described above, acts as a spring load and locks the clamp and nut to the T-slotted extrusion and prevents undesirable vertical or horizontal play (as the case may be) and prevents any loosening of the arm member 14 and bracket 16 and stand member 12 and bracket 18 respectively, resulting in a rigid mechanism and preventing vibration being transmitted to the microscope or camera.

The assembly or mechanism for adjustably mounting arm member 14 to stand member 12 is generally shown by reference 15. A first bracket 16, having upper and lower flanges 17, supports and positions arm member 14. A second bracket 18, having a pair of flanges 19, straddles stand member 12. Each of the flanges 17 and 19 incorporated on brackets 16 and 18, respectively, are made of maintenance-free bearing material to enhance the sliding of brackets 16 and 18 on arm member 16 and stand member 12 respectively. The material for flanges 17 and 19 may consist of nylon, Teflon, polyurethane, Delrin or other suitable polymers. The brackets 16 and 18 are attached in an appropriate manner so that these vertically move together on stand member 12.

Assembly 15, including brackets 16 and 18 and respective flanges 17 and 19, creates a double flange linear bearing assembly and is attached to and vertically movable on stand member 12. As has been indicated, arm member 14 is laterally movable as shown in the drawing by the sliding engagement between the flanges 17 and arm member 14. Arm member 14 is shown to be movable in a sliding manner vertically because of the adjustable interconnections of arm member 14 to bracket 16, the fixed connection between bracket 16 and bracket 18 and the slidable connection between bracket 18 and stand member 12. Once arm member 14 has been laterally moved to a suitable position, clamps 20 are manually tightened to lock arm member 14 with respect to bracket 16 in a horizontal position. Similarly, clamps 21 (only one shown in drawing) on flange 19 of bracket 18 locks arm member 14 and adjustable mounting assembly 15 in a desired vertical position by clamping with stand member 12.

A suitable holder 22 is shown at a remote end of arm member 14 for attaching and adapting a microscope or camera to the arm. Holder 22, including known such structures, can be readily interchanged to accommodate a variety of types of microscopes, cameras or the like. The holder mechanism 22 can also be made readily adjustable by the use of adjustable screws and locking devices, some of which are shown in FIG. 1.

Brackets 16 and 18 incorporate flanges 17 and 19 which are made of maintenance free bearing material and the clamps 20 and 21 function to fix the horizontal and vertical positioning of arm member 14 and remove any mechanical looseness or play between arm member 14, brackets 16 and 18 and stand member 12. The flanges 17 and 19 are shown each having two clamps 20 and 21 thereon and are of such a length as to effectively provide support for arm member 14 and, importantly, prevent undesirable tilting thereof. The resulting connection between arm member 14 and stand member 12 assures constant forces are applied to the components, eliminating vertical play while reducing unfavorable bouncing and vibration of the mechanism. This results in a rigid and non-vibrating interconnecting mechanism and prevents vibration from being transmitted through stand 10 to the mounted microscope.

It had previously been observed that a multipurpose stand was required for mounting and positioning relatively heavy microscopes, cameras and the like. In order to prevent stand 10 from tipping over or tilting as a result of the attachment of a heavy component, counterweights 23 are located on base member 11 on the opposite side to the location of the extension of arm member 14 having holder 22 thereon. Counterweight 23 may be made of an appropriate material, for example, cold rolled steel and treated with a dull chrome finish similar to base member 11. Counterweight 23 may be added and attached as appropriate to base member 11. The final arrangement can then be moved and repositioned with base member 11 as may be desired.

Stand 10 can also be conveniently used without base member 11 by attaching stand member 12 directly to a workstation bench, table, work area or wall. This may be helpful, for example, where there is a need to measure or inspect a relatively large surface area. The surface being inspected can then merely be moved on the bench surface in an appropriate manner.

Bracket 24 shown attached to stand member 12 in an appropriate manner, can be used to mount accessories that may be needed, such as a lighting member, e.g., light bulb.

What has been described is a multipurpose mounting device or stand for mounting devices such as microscopes or cameras in such a manner that the construction and features of the stand reduce tilting of the mounted device and unwanted vibration. To make use of stand 10, it is appropriately mounted on base 11 or firmly attached to the top surface or vertical portion of a workbench in a vertical orientation. A microscope, for example, is attached to adapter 22 located at the end of arm member 14. The microscope is then adjusted to be appropriately correctly positioned for use. Clamps 21 are loosened in order to change the height location of the bracket 18 as would be appropriate. Once arm member 14 is located to the desirable height position, clamps 21 are tightened. The lateral or horizontal position of the microscope can then be adjusted by loosening clamps 20 and sliding arm member 14 along bracket 16 to the appropriate desired position and then clamps 20 are re-tightened. These vertical and horizontal adjustments can be made at will until the preferred positioning of the microscope with respect to the item or product to be examined is achieved. Thus with the above described positioning of stand 10 and arm member 14 in brackets 16 and 18, an attached microscope or camera can be readily positioned in appropriate x, y and z axes. Of course, further positioning can be carried out as may be required. Even though the component may be relatively heavy, this arrangement as described prevents tilting thereof and any movement from unwanted vibration and therefore permits the precise use of the component.

A universal and multi-use stand has been described to provide the required flexibility in holding and mounting devices such as microscopes and cameras, in order to eliminate disruptions from undesirable vibrations and tilting of the mounted device, particularly in those situations where large and heavy microscopes are required and to provide accurate examination results. Preferred embodiments of the present invention have been described and illustrated by way of example only and not of limitation, such that those of ordinary skill in the art will readily appreciate that numerous modifications of detail may be made to the present invention, all coming within its spirit and scope.

What is claimed is:

1. A stand adapted for mounting an instrument and a lamp for the instrument, said stand comprising:
    an elongated stand post adapted for mounting in a vertical orientation;
    a first arm with an instrument holder at one end of the first arm, said first arm projecting horizontally from said stand post with said one end projecting away from said stand post, said first arm being adjustably attached to said stand post for movement in a vertical direction and a horizontal direction; and
    a second arm attached to said stand post parallel to said first arm to support the lamp; and wherein
    said instrument is a camera, and said second arm is attached to said stand post beneath said first arm; and
    said first arm moves independently of said second arm; and further comprising:
    a base plate supporting said stand post in said vertical orientation, said base plate including a first plate portion underneath said first arm on one side of said stand post and a second plate portion underneath said first arm on an opposite side of said stand post; and
    a counterweight mounted on said base plate on a side of said stand post opposite said holder to counter balance said instrument such that said stand will stand upright despite a weight of said instrument without said stand being fixedly attached to any support surface.

2. A stand as set forth in claim 1 wherein said second arm has a horizontal slot.

3. A stand as set forth in claim 1 further comprising an adjustable mounting structure to project said first arm horizontally from said stand post, said adjustable mounting structure slidably attached to said stand post for vertical movement of said mounting structure and said first arm, said first arm being slidably attached to said adjustable mounting structure for horizontal movement of said first arm.

4. A stand as set forth in claim 3 wherein said mounting structure has two parallel flanges defining a horizontal channel therebetween, said first arm being adjustably held between said two flanges.

5. A stand as set forth in claim 4 wherein said mounting structure has two flanges which engage said stand post on opposite surfaces of said stand post.

6. A stand as set forth in claim 3 wherein said mounting structure has two flanges which engage said stand post on opposite surfaces of said stand post.

7. A stand as set forth in claim 1 wherein said second arm is separate from and not attached to said first arm.

8. A stand as set forth in claim 1 wherein said first arm is rigid and straight, and said second arm is rigid and straight.

9. A stand adapted for mounting an instrument and a lamp for the instrument, said stand comprising:
    an elongated stand post adapted for mounting in a vertical orientation;
    a first arm with an instrument holder at one end of the first arm, said first arm projecting horizontally from said stand post with said one end projecting away from said stand post, said first arm being adjustably attached to said stand post for movement in a vertical direction and a horizontal direction; and
    a second arm attached to said stand post parallel to said first arm to support the lamp; and wherein
    said instrument is a camera, and said second arm is attached to said stand post beneath said first arm; and further comprising:
    a base plate supporting said stand post in said vertical orientation, said base plate including a first plate portion underneath said first arm on one side of said stand post and a second plate portion underneath said first arm on an opposite side of said stand post; and
    a counterweight mounted on said base plate on a side of said stand post opposite said holder to counter balance said instrument such that said stand will stand upright despite a weight of said instrument without said stand being fixedly attached to any support surface.

* * * * *